(12) United States Patent
Kawasaki (10) Patent No.: US 8,914,591 B2
(45) Date of Patent: Dec. 16, 2014

(54) INFORMATION PROCESSING APPARATUS, METHOD FOR CONTROLLING SAME

(75) Inventor: Hiromasa Kawasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 319 days.

(21) Appl. No.: 13/399,026

(22) Filed: Feb. 17, 2012

(65) Prior Publication Data

US 2012/0221806 A1    Aug. 30, 2012

(30) Foreign Application Priority Data

Feb. 24, 2011    (JP) ................ 2011-038357

(51) Int. Cl.
*G06F 12/00* (2006.01)
*G06F 3/12* (2006.01)
*G06F 3/06* (2006.01)

(52) U.S. Cl.
CPC ............ *G06F 3/1214* (2013.01); *G06F 3/0676* (2013.01); *G06F 3/1247* (2013.01); *G06F 3/1277* (2013.01); *G06F 3/0656* (2013.01); *G06F 3/0611* (2013.01); *G06F 3/1285* (2013.01)
USPC ............. 711/154; 711/158; 711/E12.075; 358/1.15; 358/1.16

(58) Field of Classification Search
None
See application file for complete search history.

(56) References Cited

U.S. PATENT DOCUMENTS

| | | | |
|---|---|---|---|
| 5,550,997 A * | 8/1996 | Ip et al. ................ | 711/103 |
| 5,623,604 A * | 4/1997 | Russell et al. ............ | 717/167 |
| 6,000,021 A * | 12/1999 | Saito et al. ............. | 711/163 |
| 6,539,396 B1 * | 3/2003 | Bowman-Amuah ........ | 707/769 |
| 6,615,253 B1 * | 9/2003 | Bowman-Amuah ........ | 709/219 |
| 7,181,572 B2 * | 2/2007 | Walmsley ............. | 711/128 |
| 7,243,193 B2 * | 7/2007 | Walmsley ............. | 711/154 |
| 7,266,661 B2 * | 9/2007 | Walmsley ............. | 711/164 |
| 7,408,667 B2 * | 8/2008 | Ferlitsch .............. | 358/1.15 |
| 7,424,627 B2 * | 9/2008 | Kobayashi ............ | 713/300 |
| 7,536,519 B2 * | 5/2009 | Murayama ............ | 711/154 |
| 7,568,068 B2 * | 7/2009 | Kulkarni et al. ........ | 711/113 |
| 7,592,829 B2 * | 9/2009 | Walmsley et al. ........ | 326/8 |
| 7,770,022 B2 * | 8/2010 | Ferlitsch et al. ........ | 713/189 |
| 7,818,519 B2 * | 10/2010 | Plunkett ............. | 711/158 |
| 7,882,400 B2 * | 2/2011 | Sato et al. ............ | 714/42 |
| 8,214,607 B2 * | 7/2012 | Williams ............. | 711/154 |
| 2001/0025343 A1 * | 9/2001 | Chrisop et al. ......... | 713/193 |
| 2002/0089689 A1 * | 7/2002 | Ferlitsch et al. ........ | 358/1.15 |
| 2004/0143710 A1 * | 7/2004 | Walmsley ............ | 711/144 |
| 2005/0210179 A1 * | 9/2005 | Walmsley et al. ........ | 711/3 |
| 2005/0286063 A1 * | 12/2005 | Owen et al. .......... | 358/1.13 |
| 2006/0132822 A1 * | 6/2006 | Walmsley ............ | 358/1.14 |
| 2006/0294312 A1 * | 12/2006 | Walmsley ............ | 711/122 |
| 2010/0118330 A1 * | 5/2010 | Feijoo et al. .......... | 358/1.15 |

FOREIGN PATENT DOCUMENTS

JP    2001-270173    10/2001

* cited by examiner

*Primary Examiner* — Edward Dudek, Jr.
*Assistant Examiner* — Christopher Birkhimer
(74) *Attorney, Agent, or Firm* — Cowan, Liebowitz & Latman, P.C.

(57) ABSTRACT

An information processing apparatus processes data to be processed while accessing data to be processed that is stored in a memory or a HDD. The information processing apparatus determines the process content and calculates the access number to the HDD based on the determined process content and the content of data to be processed. The information processing apparatus also decides to store data to be processed in the memory when the access number is more than or equal to a threshold value. The information processing apparatus decides to store data to be processed in the HDD when the access number is less than the threshold value.

6 Claims, 7 Drawing Sheets

INFORMATION PROCESSING APPARATUS, METHOD FOR CONTROLLING SAME

BACKGROUND OF THE INVENTION

1. Field of the Invention

The present invention relates to an information processing apparatus and a method for controlling the same.

2. Description of the Related Art

An information processing apparatus which executes processing while accessing the data to be processed that is stored in a storage unit has been proposed. This information processing apparatus performs, for example, format conversion processing. In case that the information processing apparatus slowly and frequently accesses to the storage unit which stores data to be processed, total accessing time to the data to be processed increases. As a result, overall processing time gets longer.

Japanese Patent Laid-Open No. 2001-270173 discloses a print control apparatus that stores registration data used for print information in a storage unit such as a HDD providing slow access speed, and moves registration data in advance to a storage unit such as a memory providing fast access speed when the received printing information includes an instruction to use registration data. The HDD is an abbreviation for Hard Disk Drive.

In a cloud computing and a server environment, a situation frequently occurs where the information processing apparatus executes a plurality of processes including, for example, format conversion while accessing the data to be processed. If a technique disclosed in Japanese Patent Laid-Open No. 2001-270173 is applied in such circumstances, the information processing apparatus is incapable of storing all of data to be processed on the HDD in the memory, resulting in storing remaining data not in the memory but in the HDD. As a result, an access to the HDD occurs. Hence, when a processing in relation to data that could not be stored in the memory and stored in the HDD is a processing that requires large number of HDD access, total access time to data to be processed gets longer, and processing requires more time.

In other words, an information processing apparatus that shortens the total access time to data to be processed by distributing the storage destination of data to be processed in accordance with a process content and data to be processed has not been proposed.

SUMMARY OF THE INVENTION

An information processing apparatus of the present invention processes data to be processed while accessing the data to be processed that is stored in a first storage unit or a second storage unit for which the access speed differs from each other, and distributes a storage destination of data to be processed in accordance with the content of data to be processed.

An information processing apparatus of an aspect according to this invention processes data to be processed while accessing the data to be processed which is stored in a first storage unit or a second storage unit having an access speed is slower than that of the first storage unit. The information processing apparatus comprises a process content determination unit configured to determine a process content, an access number calculation unit configured to calculate an access number to the second storage unit based on the determined process content and a content of the data to be processed, and a decision unit configured to decide to store the data to be processed in the first storage unit when the calculated access number is more than or equal to a predetermined first threshold value, and decide to store the data to be processed in the second storage unit when the calculated access number is less than the first threshold value.

Further features of the present invention will become apparent from the following description of exemplary embodiments (with reference to the attached drawings).

DESCRIPTION OF THE EMBODIMENTS

Figure 1:
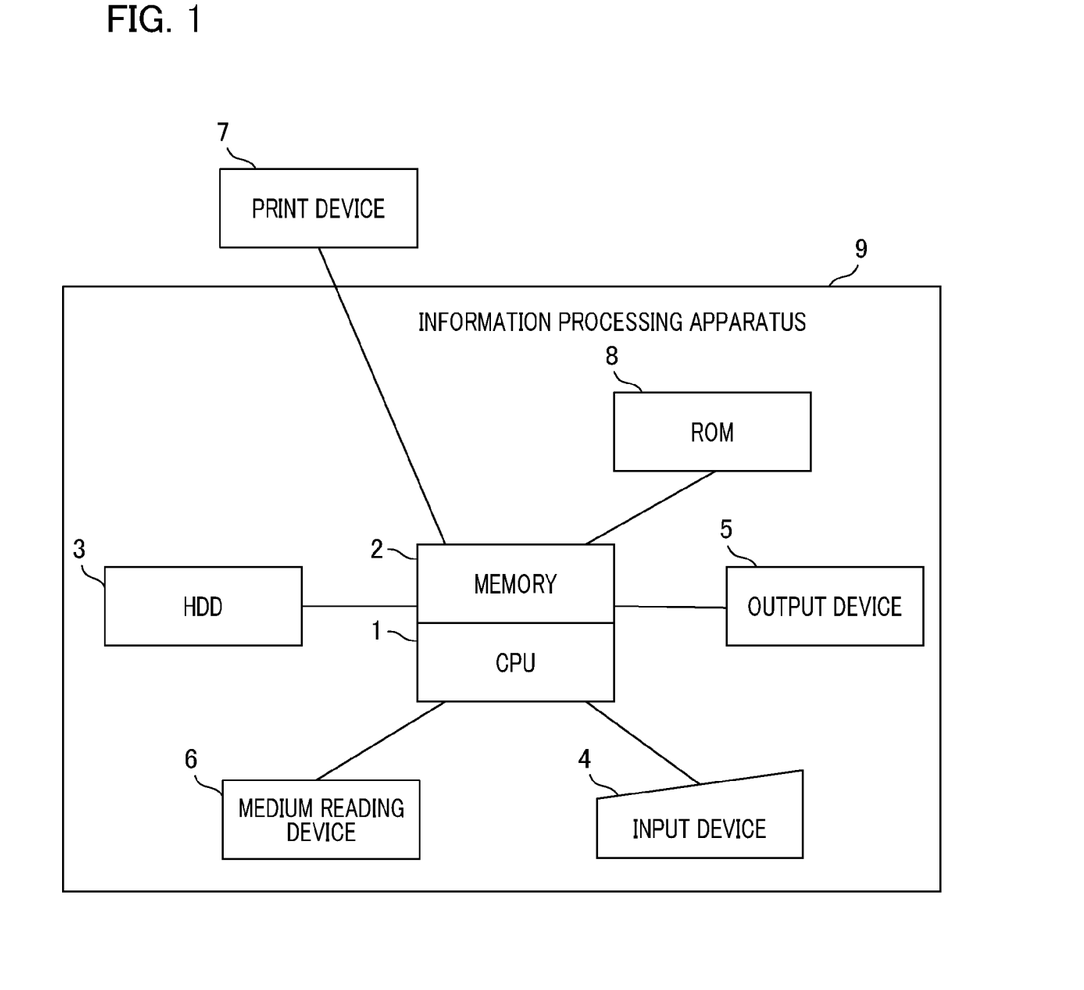
FIG. 1 is a diagram illustrating an example of a system configuration of the present embodiment.

FIG. 1 is a diagram illustrating an example of a system configuration of the present embodiment. The system shown in FIG. 1 includes a print device 7 and an information processing apparatus 9. The print device 7 prints out print data generated by the information processing apparatus 9 in accordance with the instructions of the information processing apparatus 9. The information processing apparatus 9 is the information processing apparatus of the present embodiment. The information processing apparatus 9 is an apparatus that processes data to be processed while accessing the data to be processed which is stored in a HDD 3 or a memory 2. The information processing apparatus 9, for example, sets original data generated by a predetermined application to data to be processed, and then converts a format as well as generates print data based on this data to be processed. An access speed to the HDD 3, which is a second storage unit, is slower than the access speed to the memory 2, which is a first storage unit.

The print device may execute processing which the information processing apparatus 9 executes. Also, a server that provides Web service or a server that operates by cloud computing may execute processing which the information processing apparatus 9 executes.

The information processing apparatus 9 functions as a Filter Pipeline System. Filter Pipeline System has a configuration in which a plurality of removable modules, that is, process execution units, are connected. Each module functions as a "Filter" and connected via the Pipeline. In this Filter Pipeline system, an output of certain Filter becomes an input of next Filter.

As shown in FIG. 1, the information processing apparatus 9 includes a CPU (Central Processing Unit) 1, the memory 2, the HDD, an input device 4, an output device 5, and a medium reading device 6. The CPU 1 controls the information processing apparatus 9 overall. For example, the CPU 1 acquires a program required for processing and data relating to the program from the medium reading device 6. For this purpose, the medium reading device 6 loads the above program and data from a storage medium such as a floppy (registered trademark) disk, a CD-ROM, and an IC memory.

When the input device 4 inputs execution instructions for processing (for example, print instructions), the CPU 1 executes processing based on the acquired program and data as described above, and outputs an execution result to the output device 5 or the print device 7. The CPU 1 executes processing by controlling a format conversion device 11 shown in FIG. 2A. The format conversion device 11 is a printer driver or an application which operates on the OS of the information processing apparatus 9. The CPU 1 outputs a processing result to the output device 5 or the print device 7. The input device 4 inputs input information (for example, execution instruction for processing) in accordance with a user's operation. The input device 4 includes a program keyboard, a pointing device and the like.

Figure 2A:
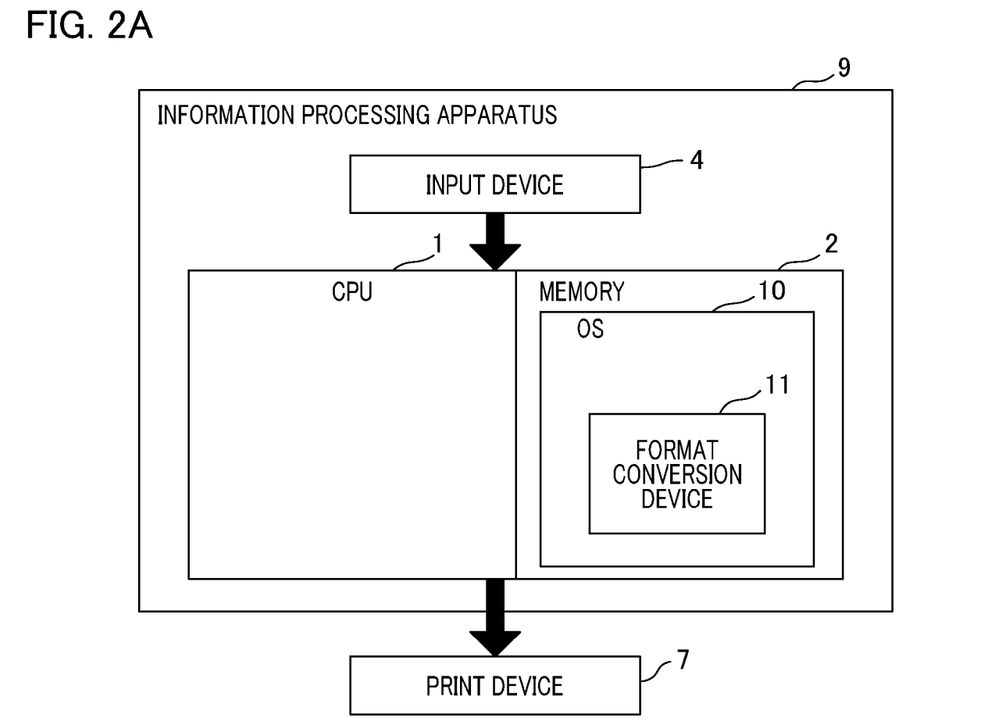
FIG. 2A is a diagram illustrating an example of a configuration of an information processing apparatus.
Figure 2B:
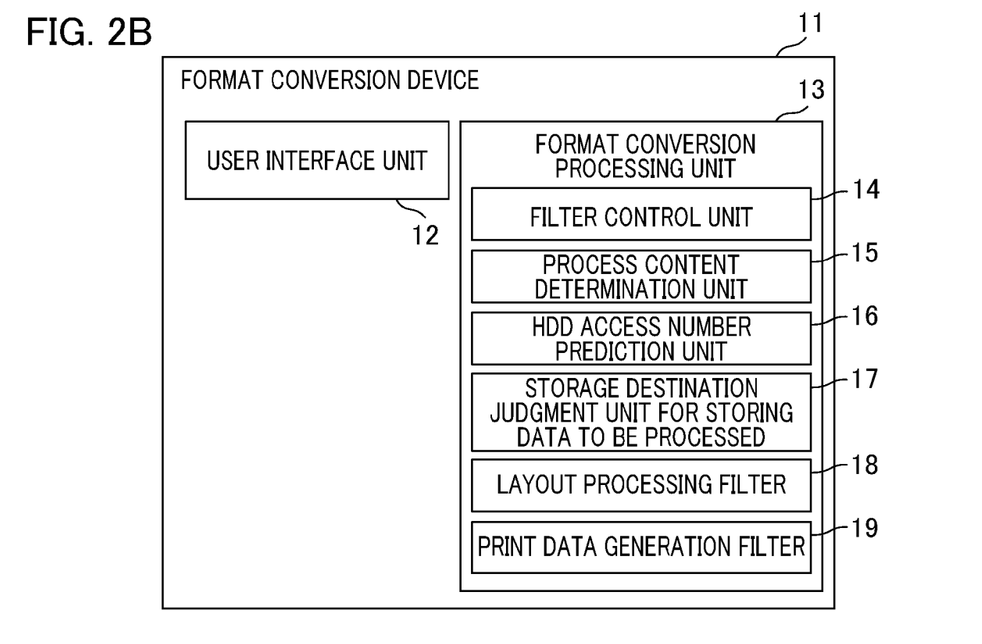
FIG. 2B is a functional block diagram of a format conversion device.

FIGS. 2A and 2B are diagrams illustrating an example of a configuration of the information processing apparatus. FIG. 2A indicates the overall configuration of the information processing apparatus. The memory that is included in the information processing apparatus 9 stores the OS 10, and the format conversion device 11 operates on the OS 10. The CPU 1 controls the format conversion device 11, generates print data by executing print processing corresponding to the print instruction that the input device 4 has input, and outputs the generated print data to the print device 7. The controlling method of the information processing apparatus of the present embodiment is realized by each configuration units which is included in the information processing apparatus 9 shown in FIGS. 2A and 2B.

FIG. 2B indicates an example of a functional diagram of the format conversion device. The format conversion device 11 operates as a printer driver, an application and the like. The format conversion device 11 includes a user interface unit 12 and a format conversion processing unit 13.

The user interface unit 12 inputs various information in accordance with the user operation. The user interface unit 12, for example, inputs print setting information for settings and instructs the print processing to the print device 7 to start in accordance with the user's operation. A predetermined processing unit (not shown), which is included in the format conversion device 11, generates a print setting file based on the input print setting information and stores the print setting information in a storage unit (not shown). The predetermined processing unit generates a Filter configuration file based on the information input by the user interface unit 12 and stores it in the storage unit. A Filter for processing and a processing order are defined in the Filter configuration file.

The format conversion processing unit 13 executes format conversion processing on data to be processed. The format conversion processing unit 13 includes a plurality of Filters as a process execution unit. Each Filter processes data to be processed in a predetermined Filter sequence (in sequence of a process execution unit).

In the example that is shown in FIG. 2B, the format conversion processing unit 13 includes a layout processing Filter 18 and a print data generation Filter 19. The layout processing Filter 18 performs layout processing. The print data generation Filter 19 performs print data generation processing. Naturally, the layout processing Filter 18 and the print data generation Filter 19 are an example of a plurality of Filters included in the format conversion processing unit 13, the format conversion processing unit 13 may include other Filters.

Also, the format conversion processing unit 13 includes a Filter control unit 14, a process content determination unit 15, a HDD access number prediction unit 16, a storage destination judgment unit for storing data to be processed 17 (hereinafter referred to as "storage destination judgment unit 17"). The Filter control unit 14 controls the sequencing of processes, input/output of each Filter and the like. More specifically, the Filter control unit 14 loads the Filter configuration file from the storage unit in advance, then decides the filter for processing and the order of processes based on definitional content of the Filter configuration file.

The process content determination unit 15 functions as a process content determination unit which determines the process content based on a print configuration file and the Filter configuration file. The HDD access number prediction unit 16 functions as an access number calculation unit which predicts (calculates) a HDD access number based on the content of the process content determined by the process content determination unit 15 and the content of data to be processed. The HDD access number is the number of access HDD 3 that is necessary for executing processing. In the following, the predicted HDD access number is described as "HDD access number predicted value".

The storage destination judgment unit 17 functions as a decision unit that decides data to be processed based on the HDD access number predicted value. More specifically, the storage destination judgment unit 17 decides to store data to be processed in the memory 2 when the HDD access number predicted value calculated by HDD access number prediction unit 16 is equal to or greater than a predetermined first threshold value. Also, the storage destination judgment unit 17 decides to store data to be processed in the HDD 3 when the HDD access number predicted value calculated by HDD access number prediction unit 16 is less than the predetermined first threshold value.

The process content determination unit 15, the HDD access number prediction unit 16, and the storage destination judgment unit 17 may be provided on the Filter control unit 14 or may be respectively provided on the each Filter.

Figure 3:
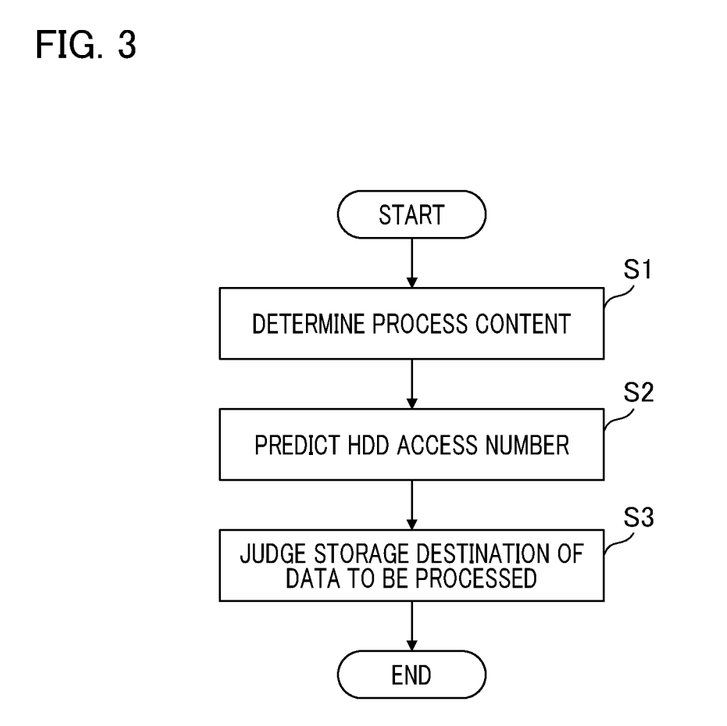
FIG. 3 is a flowchart illustrating an overall operational process of the format conversion device.

FIG. 3 is a flowchart illustrating an overall operating process in the format conversion device. First, the process content determination unit 15 determines the process content based on the Filter configuration file and the print setting file (step S1). A process, such as calling the print data generation Filter 19 after the layout processing Filter 18, is defined in the Filter configuration file. The details of the processes that Filter realizes, such as carrying out 2-up processing and the like, through the layout processing Filter 18 is defined in the print setting file.

Next, the HDD access number prediction unit 16 predicts (calculates) the HDD access number regarding data to be processed based on the process content determined by the process content determination unit 15 and the content of data to be processed (step S2). The content of data to be processed is, for example, an attribute of data to be processed. The attribute of data to be processed is an image, graphics, a character and the like.

Next, the storage destination judgment unit 17 judges whether the storage destination of data to be processed is in the HDD or in the memory based on the value of the HDD access number (the HDD access number predicted value).

Figure 4:
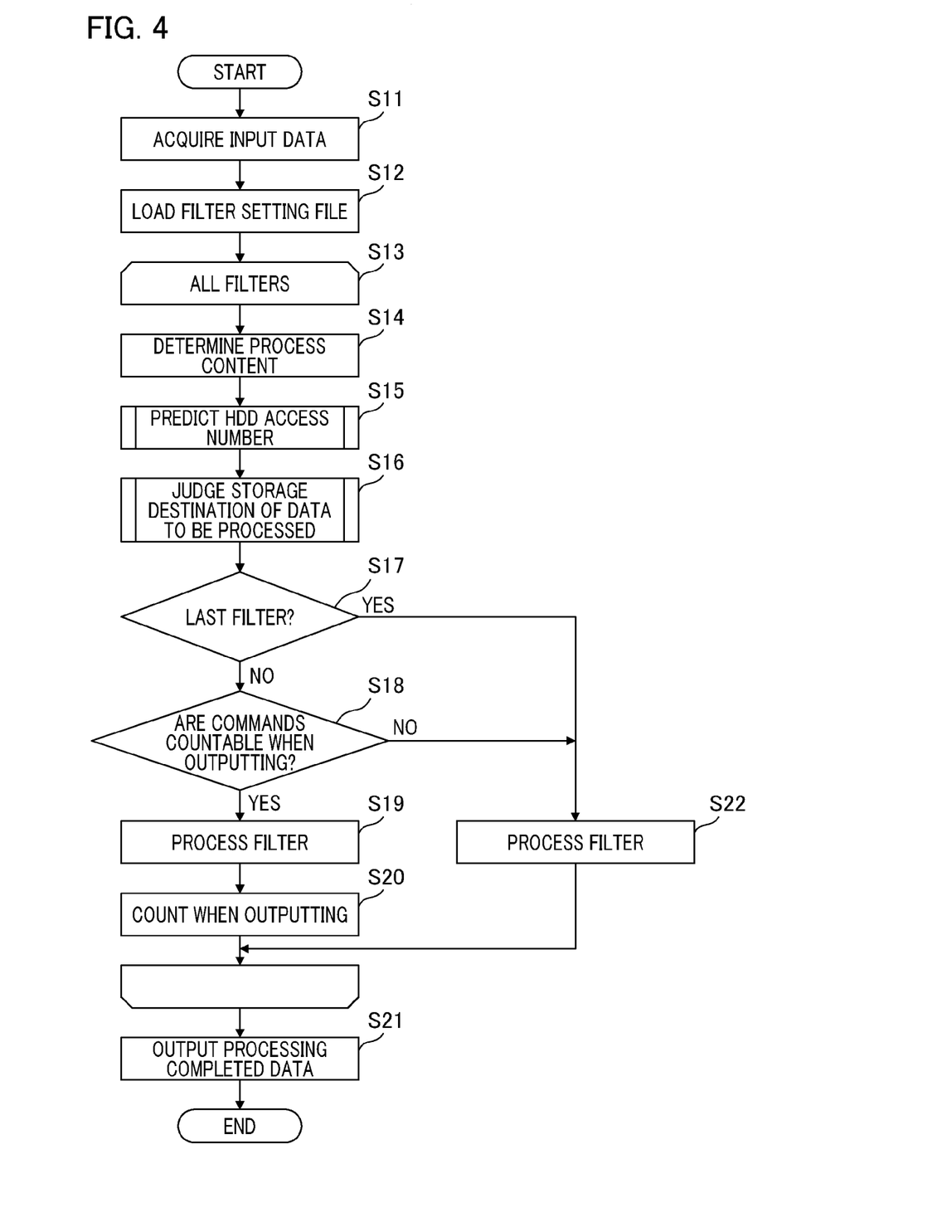
FIG. 4 is a flowchart illustrating a detail of an example of the operational process of the format conversion device.

FIG. 4 is a flowchart illustrating a detail of an example of an operating process in the format conversion device. In this example, the format conversion device 11 judges whether the storage destination of data to be processed is in the HDD or in the memory with respect to each Filter. With this arrangement, an appropriate storage destination corresponding to processing of each Filter included in one job may be judged, therefore the overall processing speed is improved.

First, the Filter control unit 14 acquires input data specified by the user interface unit (step S11). Then, the Filter control unit 14 loads the Filter configuration file, and decides the Filter for processing and the order of processes performed by the Filter (hereinafter referred to as "the order of Filter") (step S12).

Next, regarding all of Filters, each time the Filter executes processing, processes of steps from S14 to S20 are performed corresponding to the order of Filter that was decided in the S12 as described above (step S13). In other words, the process content determination unit 15, the HDD access number prediction unit 16, and the storage destination judgment unit 17 execute the following processing on each processing of data to be processed by respective Filters. The process content determination unit 15 executes processing to determine the process content. The HDD access number prediction unit 16 executes processing to calculate the HDD access number predicted value. The storage destination judgment unit 17 executes processing to decide whether to store data to be processed in the memory 2 or the HDD 3.

More specifically, the process content determination unit 15 determines the process content executed by the Filter based on the Filter configuration file and the print setting file (step S14). Then, the HDD access number prediction unit 16 predicts the HDD access number (step S15). Next, the storage destination judgment unit 17 judges the storage destination of data to be processed (step S16). The Filter firstly processes the input data acquired in step S11 as data to be processed. In subsequent processing performed by the Filter, an output by prior Filter is considered as data to be processed.

Next, the HDD access number prediction unit 16 judges whether or not the Filter whose turn it is for processing is last Filter (step S17). If the Filter that is at the stage of processing is the last Filter, this Filter performs processing (step S22).

If the Filter whose turn it is for processing is not the last Filter, the HDD access number prediction unit 16 judges whether or not the Filter is capable of counting commands when outputting (step S18). If the Filter is capable of counting commands when outputting, the process advances to step S22. If the Filter is incapable of counting commands when outputting, the Filter processes (step S19). Then, the Filter or the predetermined processing unit included in the format conversion processing unit 13 counts according to the attribute of data to be processed when the Filter outputs a processing result (step S20). The HDD access number prediction unit 16 sets the attribute intended to be the command counting target based on the file format of data to be processed or the characteristics of the format conversion device.

In other words, the Filter that has completed the processing outputs the processing result to the Filter that performs processing next, and counts the number of commands corresponding to the attribute of data to be processed when outputting said processing result. When the Filter counts the commands when outputting, there is no need to count the commands when the HDD access number in next Filter is predicted. Therefore, this arrangement allows high-speed processing. When the processes from S14 to S20 described above have completed for all of the Filters, the Filter control unit 14 outputs processing completion data to the print device 7 (step S21).

Figure 5A:
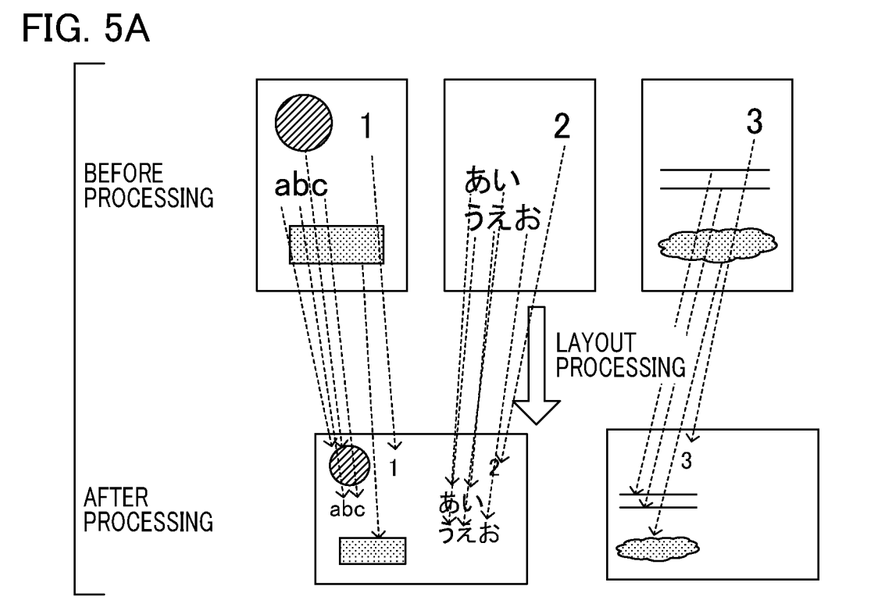
FIG. 5A is a diagram illustrating an example of a layout process when displacement of a coordinate of a drawing object occurs.
Figure 5B:
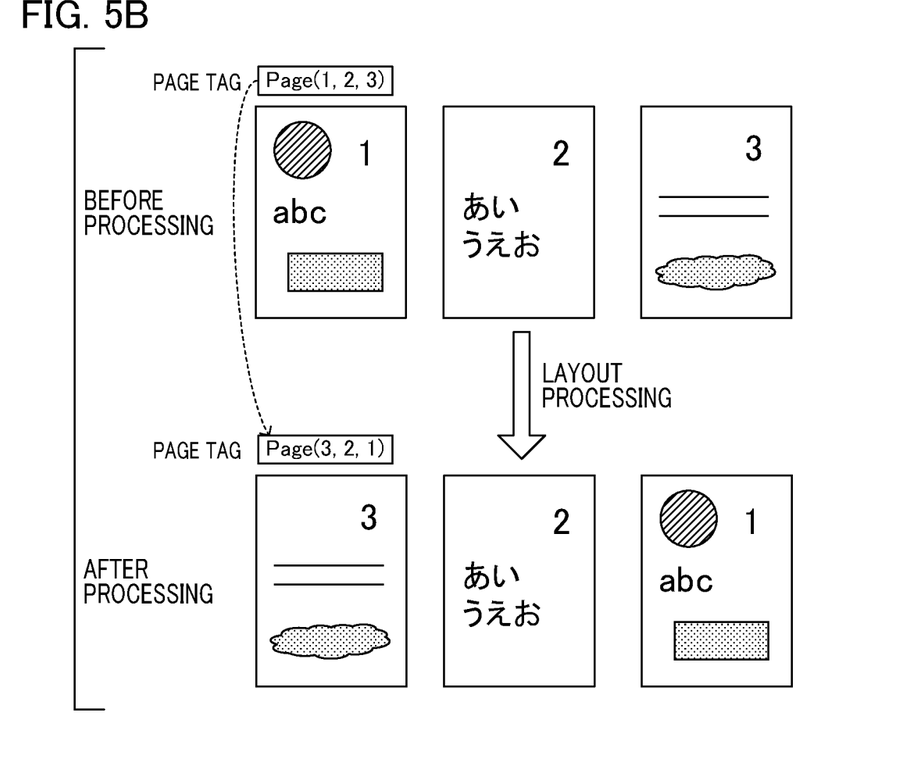
FIG. 5B is a diagram illustrating an example of layout process when displacement of a coordinate of a drawing object does not occur.

FIG. 5 is a diagram illustrating a relationship between the process content of the information processing apparatus and the HDD access number. FIG. 5A indicates an example of layout processing in which the displacement of the coordinates of the drawing objects in the pages occurs. Specifically, the process content shown in FIG. 5A is 2 up processing, which is one of the layout processes by PDF.

When the process content is 2 up processing, reduction of all of the drawing objects and the offsetting of the coordinates are required for the format conversion processing unit 13. In the example shown FIG. 5A, the format conversion processing unit 13 reduces the drawing objects included in the pages prior to process and displaces the drawing objects to the corresponding coordinates in the processed pages as indicated by the arrows. For reducing all drawing data and displacing the coordinates, accessing all of the individual commands is required. Thus, the HDD access number is a value corresponding to the content of data to be processed. In other words, when the process content is the processing in which the displacement of the coordinates occurs such as 2 up processing, the HDD access number is the value corresponding to the content of data to be processed. Examples in which the displacement of the coordinates occurs include Nup processing, expansion processing, reduction processing, processing for closing up a margin and the like.

Also, when the process content is print data generation processing, it is required for the format conversion processing unit 13 that all commands be converted to the print data format. Thus, in this situation, the HDD access number is the value corresponding to the content of data to be processed.

FIG. 5B is an example illustrating layout processing in which the displacement of coordinates of the drawing objects does not occur in the pages. Specifically, the process content indicated in FIG. 5B is processing for changing the order of pages that is one of layout processing by PDF. In PDF, the order of pages is managed by page tag. The format conversion processing unit 13 executes processing for changing the order of pages by changing the page tag. In the example shown in FIG. 5B, the order of pages indicated by the page tag prior to the process is in order of 1, 2, and 3. The format conversion processing unit 13 changes this page tag such that the order of 3, 2, and 1 is realized. The format conversion processing unit 13 executes processing for changing the order of pages in accordance with the page tag after the change thereby make the order of pages 3, 2, and 1.

If the format conversion processing unit 13 executes processing for changing the order of pages, the HDD access number will be nearly a constant value regardless of the content of data to be processed. That is to say, in processing in which no displacement of the coordinates occurs, such as processing for changing the order of pages, the HDD access number will be nearly a constant value regardless of the content of data to be processed. Examples in which no displacement of the coordinates occurs include processing for changing the order of pages, the code cancellation processing and the like.

The process content determination unit 15 determines whether the process content is layout processing or print data generation processing. When the process content is layout processing, the process content determination unit 15 determines whether the process content is processing in which the displacement of the coordinates occurs or processing in which no displacement of the coordinates occurs. With this arrangement, it may be determined whether or not processing is processing in which the HDD access number has a value corresponding to the content of data to be processed.

Figure 6:
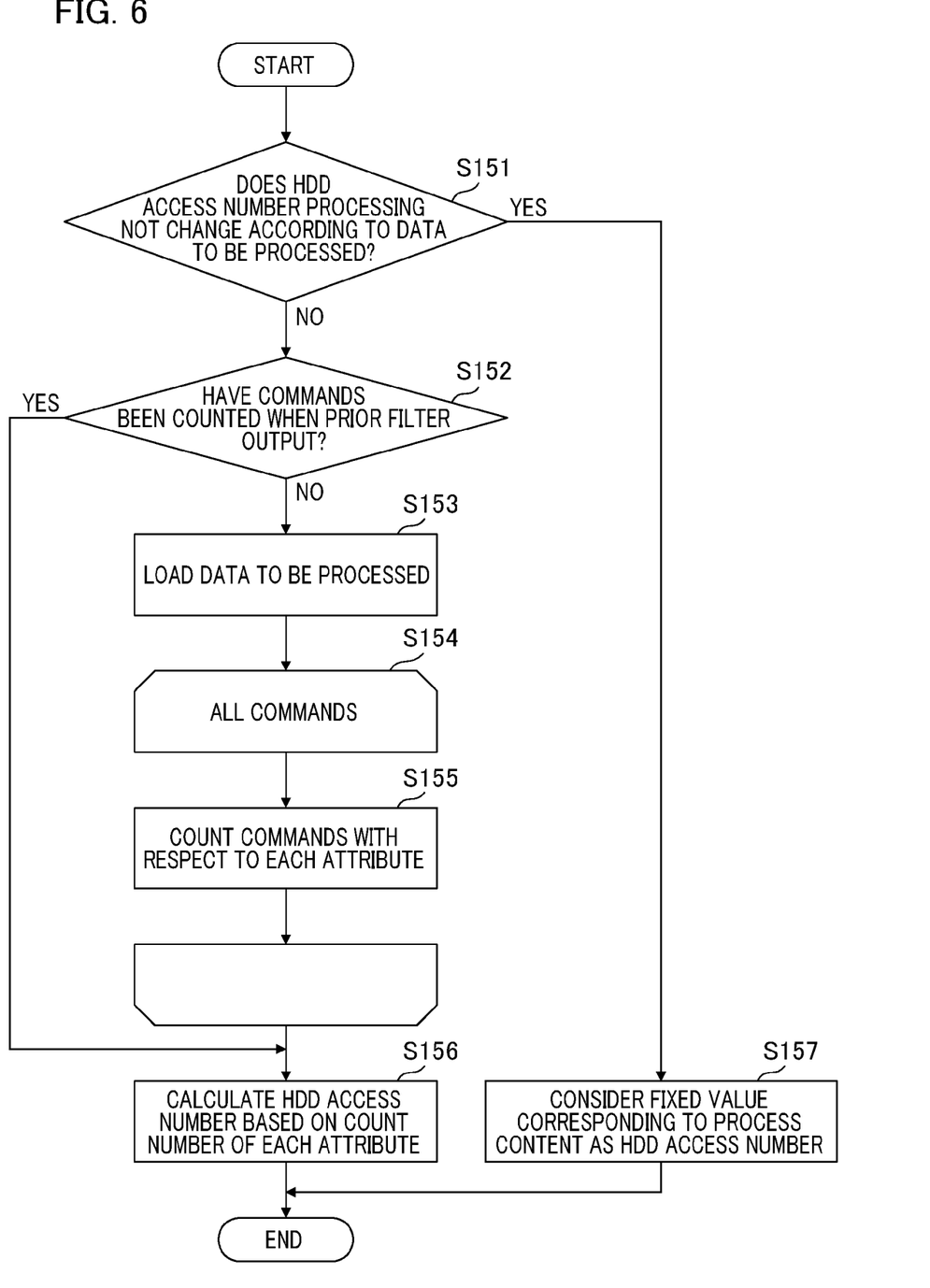
FIG. 6 is a flowchart illustrating an example of calculation process of the HDD access number.

FIG. 6 is a flowchart illustrating an example of calculation processing of the HDD access number. First, the HDD access number prediction unit 16 judges whether or not the process content specified by the process content determination unit 15 is processing in which the HDD access number does not change in accordance with the content of data to be processed (step S151). Specifically, the HDD access number prediction unit 16 judges whether the process content specified by the process content determination unit 15 is layout processing in which the displacement of the coordinates occurs, layout processing in which no displacement of the coordinates occurs, or the print data generation processing.

When the process content is either layout processing in which the displacement of the coordinate occurs, or the print data generation processing, the HDD access number prediction unit 16 judges that process content is processing in which the HDD access number changes in accordance with data to be processed. When the process content is layout processing in which no displacement of the coordinates occurs, the HDD access number prediction unit 16 judges that the process content is processing in which the HDD access number does not change in accordance with data to be processed.

When the process content is processing in which the HDD access number does not change in accordance with data to be processed, the HDD access number prediction unit 16 calculates the predetermined fixed value corresponding to said processing as a HDD access number predicted value (step S157). With this arrangement, the HDD access number prediction unit 16 may set the appropriate HDD access number predicted value without counting the number of commands for the data to be processed.

When the process content is processing in which the HDD access number changes in accordance with data to be processed, the HDD access number prediction unit 16 judges whether or not prior Filter has counted the commands corresponding to the attribute of data to be processed when outputting (step S152). The prior Filter is the filter that has executed processing before current Filter has a turn processing. If the commands have been already counted when the prior Filter output, the HDD access number prediction unit 16 omits counting the commands of data to be processed. Thus, in this case, the process advances to step S156.

If the commands have not been counted during the prior Filter output, the HDD access number prediction unit 16 loads data to be processed (step S153). Then, the HDD access number prediction unit 16 targets all of the commands and executes the following processing. Specifically, the HDD access number prediction unit 16 counts the command number with respect to each attribute of data to be processed (step S155).

Next, the HDD access number prediction unit 16 calculates the HDD access number predicted value based on the command number with respect to each attribute (step S156). Specifically, the HDD access number prediction unit 16 calculates in advance an average value of the number of times that the HDD is accessed by one command for each attribute. The calculated average value is described as an "average HDD access number of each attribute". The HDD access number prediction unit 16 multiplies the command number of said attribute by the average HDD access number of each attribute, thereby calculating resulting total value as the HDD access number predicted value.

Specifically, the HDD access number prediction unit 16 calculates the HDD access number based on the command number corresponding to the attribute of data to be processed when the process content is layout processing in which the displacement of the coordinate occurs or the print data generating process (in S151, No).

By employing the command number for predicting the HDD access number, if the commands is small in number, the HDD access number predicted value becomes a small value even where processing is required to access each command, such as 2 up. Therefore, according to calculation processing of the HDD access number predicted value in the present embodiment, the HDD access number may be precisely predicted.

Also, the HDD access number prediction unit 16 judges whether or not the number of commands have been already counted with respect to each processing of data to be processed by means of the respective Filter, and executes the following processing when the number of commands has been already counted (Yes in S152). The HDD access number prediction unit 16 calculates the HDD access number predicted value based on the counted command number. Therefore, in this case, the count processing of data to be processed may be omitted.

Figure 7:
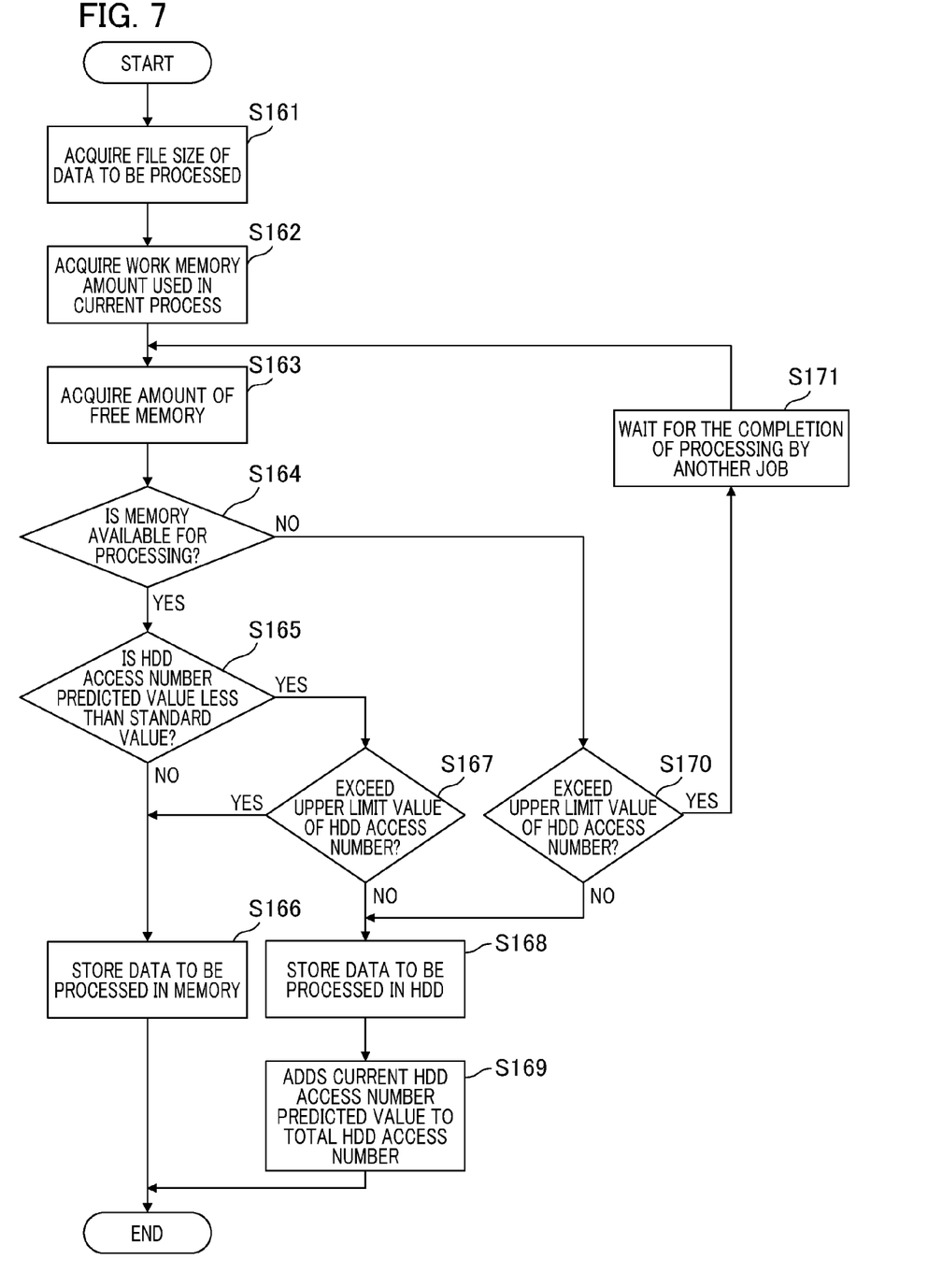
FIG. 7 is a flowchart illustrating an example of a judgment process of storage destination for storing data to be process.

FIG. 7 is a flowchart illustrating an example of judgment processing of the storage destination of data to be processed. First, the storage destination judgment unit 17 acquires the file size of data to be processed (step S161). The storage destination judgment unit 17 acquires a Work memory used in the current process (step S162).

Next, the storage destination judgment unit 17 acquires an amount of free memory for using in processing (step S163). Then, based on the amount of free memory, the storage destination judgment unit 17 judges whether or not the memory is available for processing (step S164). Specifically, the storage destination judgment unit 17 judges whether or not the total value of the file size of data acquired in step S161 for processing and the working memory acquired in step S162 is smaller than the amount of free memory.

When the total value of the file size of data to be processed data and the working memory is smaller than the amount of free memory, the storage destination judgment unit 17 judges that the memory is available for processing. Then, the process advances to step S165.

When the total value of the file size of data to be processed and the working memory is greater than the amount of free memory, the storage destination judgment unit 17 judges that the memory is available for processing. Then the process advances to step S170.

In step S165, the storage destination judgment unit 17 judges whether or not the HDD access number predicted value is less than a standard value (step S165). The standard value is the value which has been set in advance (a first threshold value) based on the capability of HDD and an actual measured value under the relevant circumstance.

When the HDD access number predicted value is not less than the standard value, the storage destination judgment unit 17 stores data to be processed in the memory (step S166). When the HDD access number predicted value is less than the standard value, the storage destination judgment unit for data to be processed 17 judges whether or not the HDD access number predicted value exceeds the upper limit value (step S167). The upper limit value of the total HDD access number is the value that has been set in advance based on the capability of the HDD and an actual measured value under the relevant circumstances. The upper limit value of the total HDD access number is a second threshold value that is smaller than aforementioned standard value.

When the HDD access number predicted value exceeds the upper limit value of the total HDD access number, the process advances to step S166. When the HDD access number predicted value does not exceed the upper limit value of the total HDD access number (i.e., it is less than or equal to the second threshold value), the storage destination judgment unit 17 stores data to be processed in the HDD (step S168). Then, the storage destination judgment unit 17 adds the current HDD access number predicted value to the total HDD access number (step S168) and completes the process.

In step S170 the storage destination judgment unit 17 acquires the total value of the HDD access number predicted value corresponding to current processing and the HDD access number predicted value of other job that is using the same HDD as the HDD used by job corresponding to current processing. Then, the storage destination judgment unit 17 judges whether or not the total value exceeds the upper limit value of the total HDD access number (step S170). The upper limit value of the total HDD access number is a third threshold value that has been set in advance. Note that aforementioned second threshold value and third threshold value may be same value.

When said total value does not exceed the upper limit value of the total HDD access number, the process advances to step S168. When said total value exceeds the upper limit value of the total HDD access number, storage destination judgment unit 17 waits for the completion of processing by another job (step S171). In other words, the storage destination judgment unit 17 decides not to store data to be processed corresponding to current processing in the HDD 3. With this arrangement, the delay due to accesses exceeding the capability of HDD 3 may be avoided. Once other job has been completed, the process returns to step S163.

As described with reference to FIG. 7, the storage destination judgment unit 17 stores data to be processed in the memory when the HDD access number predicted value is equal to or less than the standard value (see step S166). The storage destination judgment unit 17 stores data to be processed in the HDD when the HDD access number predicted value is less than the standard value (step S168). In this manner, data to be processed where the HDD access number predicted value is large is stored in the memory. As a result, the processing delay due to accessing the HDD may be reduced, and processing speed is improved.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-038357 filed Feb. 24, 2011, which is hereby incorporated by reference herein in its entirety.

What is claimed is:

1. An information processing apparatus that processes data while accessing the data which is stored in a first storage unit or a second storage unit whose access speed is slower than that of the first storage unit, the information processing apparatus comprising:
    a process content determination unit configured to determine a process content, wherein the process content indicates a content of processing performed on the data;
    an access number prediction unit configured to predict, using a value predetermined based on the determined process content, the number of times of accesses to the data, the accesses to the data being required for performing processing on the data; and
    a decision unit configured to decide to store the data in the first storage unit in a case where the predicted number is more than or equal to a predetermined first threshold value, and decide to store the data in the second storage unit in a case where the predicted number is less than the first threshold value.

2. The information processing apparatus according to claim 1,
    wherein the process content determination unit determines whether the process content is layout processing in which a displacement of coordinates occurs, the layout processing in which the displacement of coordinates does not occur, or a generation processing of print data; and
    wherein the access number prediction unit calculates a predetermined fixed value corresponding to the layout processing as the number of times of accesses when the determined process content is the layout processing in which the displacement of coordinates does not occur, and calculates the number of times of accesses based on the number of commands corresponding to an attribute of the data when the determined process content is the layout processing in which the displacement of coordinates or the generation processing of the print data occurs.

3. The information processing apparatus according to claim 2,
    wherein the information processing apparatus includes a plurality of process execution units that process the data in order of predetermined process execution;
    wherein, each time the respective process execution unit processes the data, the process content determination unit executes processing to determine the process content, the access number prediction unit executes processing to calculate the number of times of accesses, and the decision unit executes processing to decide whether to store the data in the first storage unit or the second storage unit;
    wherein, among the plurality of process execution units, the process execution unit that has completed the processing outputs a processing completion result to the process execution unit that processes next, and counts the number of commands corresponding to the attribute of the data when outputting the processing completion result; and
    wherein, each time the respective process execution unit processes the data, the access number prediction unit judges whether or not the number of commands has been counted, and calculates the number of times of accesses based on the number of commands that have been counted when the number of commands has been counted.

4. The information processing apparatus according to claim 1,
    wherein the decision unit further decides to store the data in the second storage unit when the number of times of accesses that is less than the first threshold value is less than or equal to a second threshold value smaller than the predetermined first threshold value,
    and decides to store the data in the first storage unit when the number of accesses that is less than the first threshold value exceeds the second threshold value.

5. The information processing apparatus according to claim 1, wherein the decision unit further decides not to store the data to be processed corresponding to current processing in the second storage unit when the number of accesses to the second storage unit corresponding to the current processing and the number of times of accesses to the second storage unit corresponding to other processing different from the current processing are beyond a third threshold value.

6. A method for controlling an information processing apparatus that processes data while accessing the data, which is stored a first storage unit or a second storage unit having an access speed that is slower than that of the first storage unit, the method comprising:

determining a process content, wherein the process content indicates a content of processing performed to the data;

predicting, using a value predetermined based on the determined process content, the number of times of accesses to the data, the accesses to the data being required for performing processing on the data, and deciding to store the data in the first storage unit in a case where the predicted number of accesses is equal to or greater than a predetermined first threshold value, and to store the data in the second storage unit in a case where the predicted number of accesses is less than the first threshold value.

* * * * *